(12) United States Patent
Kim et al.

(10) Patent No.: US 11,926,364 B2
(45) Date of Patent: Mar. 12, 2024

(54) FRAME FOR A PURPOSE-BUILT VEHICLE

(71) Applicants: HYUNDAI MOTOR COMPANY, Seoul (KR); KIA CORPORATION, Seoul (KR)

(72) Inventors: Nam Ho Kim, Gwangmyeong-si (KR); Won Hae Lee, Seoul (KR); Byung Joo Chung, Gunpo-si (KR); Seung Hak Lee, Asan-si (KR); Min Seok Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/976,336

(22) Filed: Oct. 28, 2022

(65) Prior Publication Data

US 2023/0264744 A1   Aug. 24, 2023

(30) Foreign Application Priority Data

Feb. 22, 2022   (KR) ........................ 10-2022-0022817

(51) Int. Cl.
| | |
|---|---|
| *B62D 21/12* | (2006.01) |
| *B62D 21/15* | (2006.01) |
| *B62D 7/02* | (2006.01) |
| *B62D 21/18* | (2006.01) |
| *B62D 27/02* | (2006.01) |
| *B62D 27/06* | (2006.01) |
| *B62D 63/02* | (2006.01) |

(52) U.S. Cl.
CPC ........... *B62D 21/12* (2013.01); *B62D 21/152* (2013.01); *B60Y 2304/05* (2013.01); *B62D 7/023* (2013.01); *B62D 21/18* (2013.01); *B62D 27/023* (2013.01); *B62D 27/06* (2013.01); *B62D 27/065* (2013.01); *B62D 63/025* (2013.01)

(58) Field of Classification Search
CPC .... B62D 21/12; B62D 21/152; B62D 33/023; B62D 63/023; B62D 27/065; B62D 21/18; B62D 27/023; B62D 27/06; B62D 7/023; B60Y 2304/05
USPC ......................................................... 296/204
See application file for complete search history.

(56) References Cited

U.S. PATENT DOCUMENTS

| | | | | |
|---|---|---|---|---|
| 8,960,776 | B2 * | 2/2015 | Boettcher | B62D 25/20 296/29 |
| 2013/0206496 | A1 * | 8/2013 | Hashimoto | B62D 21/12 180/291 |
| 2017/0001507 | A1 * | 1/2017 | Ashraf | B62D 21/07 |
| 2017/0305250 | A1 | 10/2017 | Hara | |

(Continued)

FOREIGN PATENT DOCUMENTS

| | | |
|---|---|---|
| CN | 111746649 A | 10/2020 |
| JP | H05147445 A | 6/1993 |

(Continued)

*Primary Examiner* — Amy R Weisberg
*Assistant Examiner* — Dana D Ivey
(74) *Attorney, Agent, or Firm* — Lempia Summerfield Katz LLC

(57) ABSTRACT

A frame for a purpose-built vehicle (PBV) includes: a front part frame positioned at a front side of a vehicle; a rear part frame positioned at a rear side of the vehicle; and a center part frame. The center part frame has a rectangular planar shape and is coupled between the front part frame and the rear part frame.

12 Claims, 12 Drawing Sheets

(56) References Cited

U.S. PATENT DOCUMENTS

2018/0370344 A1   12/2018  Hara
2019/0351750 A1   11/2019  Caliskan et al.
2021/0331749 A1   10/2021  Hwang et al.

FOREIGN PATENT DOCUMENTS

| JP | 2006044400 A | 2/2006 |
|----|--------------|--------|
| KR | 101327084 B1 | 11/2013 |
| KR | 20210130883 A | 11/2021 |

* cited by examiner

FRAME FOR A PURPOSE-BUILT VEHICLE

CROSS REFERENCE TO RELATED APPLICATION

The present application claims priority to Korean Patent Application No. 10-2022-0022817, filed on Feb. 22, 2022, the entire contents of which are incorporated herein for all purposes by this reference.

BACKGROUND

Field of the Disclosure

The present disclosure relates to a technology related to a structure of a vehicle frame.

Description of the Related Art

A purpose-built vehicle (PBV) includes a life module configured to define passenger and loading spaces having various shapes in accordance with the market demand, and a drive module substantially related to the driving of the vehicle. The life module, which may meet various demands, may be coupled to the predetermined drive module such that various types of vehicles may be easily produced. This makes it possible to very effectively follow the market trend of diversified small-quantity production.

A frame is used for the drive module. An overall length of the frame in the related art approximates to an overall length of a vehicle almost completely manufactured. For this reason, a very large exclusive facility is required to perform electrodeposition coating on the frame. A large amount of logistics cost is also required to transport the frame.

In addition, the entire frame needs to be replaced during the maintenance of the vehicle using the above-mentioned frame, which greatly increases vehicle maintenance costs.

The foregoing, explained in the Background, is intended merely to aid in understanding the background of the present disclosure. The foregoing is not intended to mean that the present disclosure falls within the purview of the related art that is already known to those having ordinary skill in the art.

SUMMARY

Accordingly, the present disclosure has been made keeping in mind the above problems occurring in the related art. The present disclosure is intended to provide a frame for a purpose-built vehicle (PBV). The frame is capable of remarkably reducing manufacturing and logistics costs and greatly contributing to a reduction in maintenance cost required for the maintenance of a vehicle.

According to one aspect, a frame is provided for a PBV. The frame includes: a front part frame positioned at a front side of a vehicle; a rear part frame positioned at a rear side of the vehicle; and a center part frame. The center part frame has a rectangular planar shape and is coupled between the front part frame and the rear part frame. Protruding coupling parts are respectively provided integrally with ends of the front and rear part frames facing the center part frame and protruding to overlap the center part frame.

The protruding coupling part may have an open cross-section that surrounds a part of a transverse section of the center part frame.

Side members, each having a quadrangular cross-section, may be provided at two opposite sides of the center part frame. The protruding coupling part may have an L-shaped cross-section that surrounds one edge of the quadrangular cross-section of the side member.

The protruding coupling part may have a cross-sectional shape that surrounds one edge of the quadrangular cross-section of the side member positioned outside a vehicle body.

The side member of the center part frame may be fixed to the front part frame and the rear part frame by first horizontal fastening members. The first horizontal fastening members may penetrate the protruding coupling parts and the side member in a transverse direction in a state in which two opposite ends of the side member of the center part frame are respectively inserted into the front part frame and the rear part frame.

The side member of the center part frame may be fixed to the front part frame and the rear part frame by vertical fastening members. The vertical fastening members may penetrate the protruding coupling parts and the side member in an upward/downward direction in a state in which the side member of the center part frame overlaps the protruding coupling parts.

A stay may be coupled to the side member of the center part frame so as to overlap the side member of the center part frame and surround the other edge other than the edge surrounded by the protruding coupling part.

The stay may have an L-shaped cross-section and be elongated in a longitudinal direction of the side member.

The vertical fastening member may be fastened while sequentially penetrating the stay, the side member, and the protruding coupling part.

The stay may be fixed to the side member by a second horizontal fastening member that penetrates the side member and the stay in the transverse direction.

The protruding coupling part may be installed to surround an upper edge of the quadrangular cross-section of the side member. The stay may be disposed below the protruding coupling part and installed to surround a lower edge of the quadrangular cross-section of the side member.

A lower end of the protruding coupling part and an upper end of the stay may be installed to face and be in contact with each other while defining a straight line.

The lower end of the protruding coupling part and the upper end of the stay may have concave-convex portions and be installed to face and be in contact with each other.

The lower end of the protruding coupling part and the upper end of the stay may be installed to face each other and have a predetermined interval therebetween.

The protruding coupling part and the stay may be installed to overlap each other at a lateral side of the side member.

According to another aspect, a method of assembling a frame for a PBV is provided. The method includes independently forming a front part frame positioned at a front side of a vehicle, a rear part frame positioned at a rear side of the vehicle, and a center part frame positioned between the front part frame and the rear part frame. The method further includes aligning at least one of the front and rear part frames with the center part frame, and temporarily fixing at least one of the front and rear part frames, which is aligned with the center part frame, to the center part frame. The method also includes temporarily fixing a stay to the center part frame, and finally fixing at least one of the front and rear part frames, which is temporarily fixed to the center part frame, to the center part frame together with the stay.

Protruding coupling parts may be respectively provided at ends of the front and rear part frames facing the center part frame and protrude to overlap the center part frame. The front and rear part frames may be aligned with the center part frame as the protruding coupling parts overlap the center part frame.

At least one of the front and rear part frames, which is aligned with the center part frame, may be temporarily fixed to the center part frame by a first horizontal fastening member that penetrates the protruding coupling part and the center part frame in a transverse direction.

The stay may be temporarily fixed to the center part frame by a second horizontal fastening member that penetrates the center part frame and the stay in the transverse direction.

The front and rear part frames may be finally fixed to the center part frame by vertical fastening members coupled while sequentially penetrating the stay, the center part frame, and the protruding coupling parts.

According to the present disclosure, it is possible to remarkably reduce manufacturing and logistics costs required for the frame for a PBV and to greatly reduce maintenance costs required for the maintenance of the vehicle.

DETAILED DESCRIPTION OF THE DISCLOSURE

Figure 1:
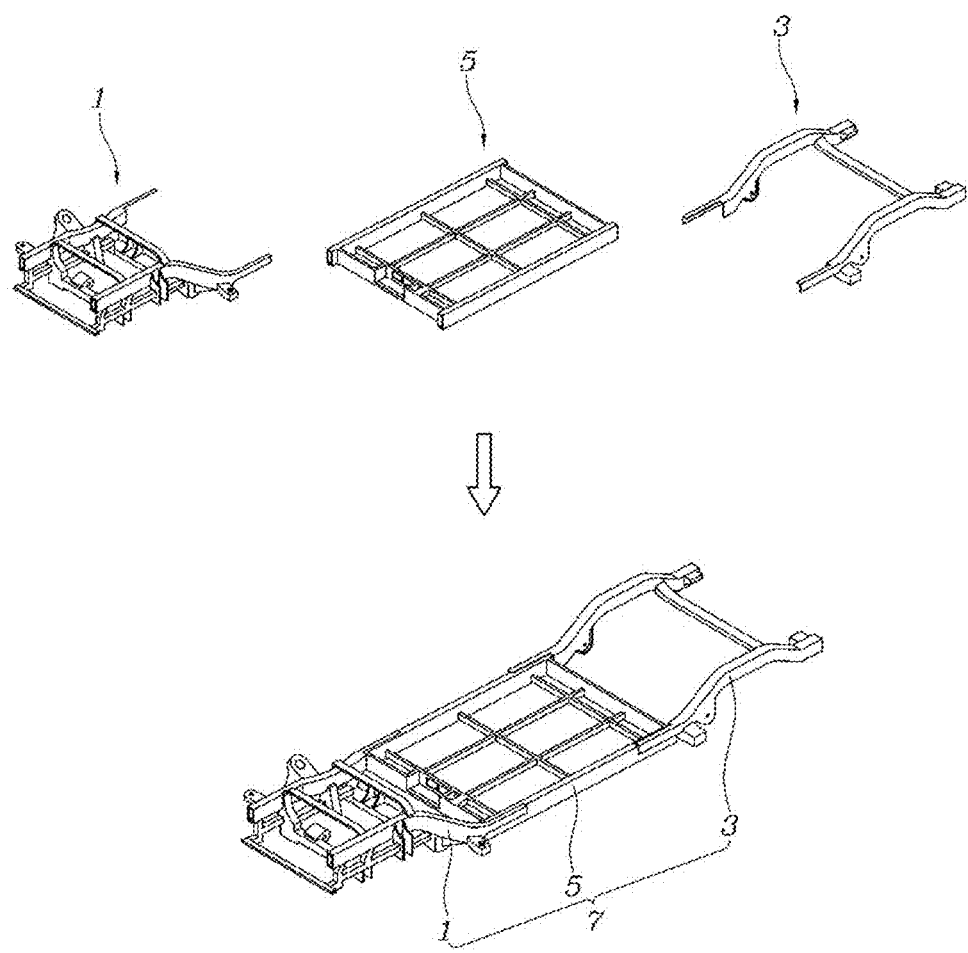
FIG. 1 is a view illustrating a structure of a frame for a purpose-built vehicle (PBV) according to the present disclosure.
Figure 2:
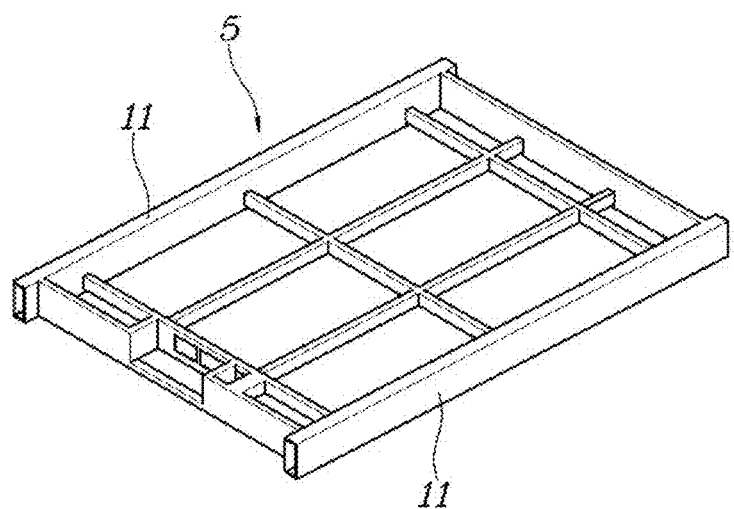
FIG. 2 is a detailed view illustrating a center part frame in FIG. 1.
Figure 3:
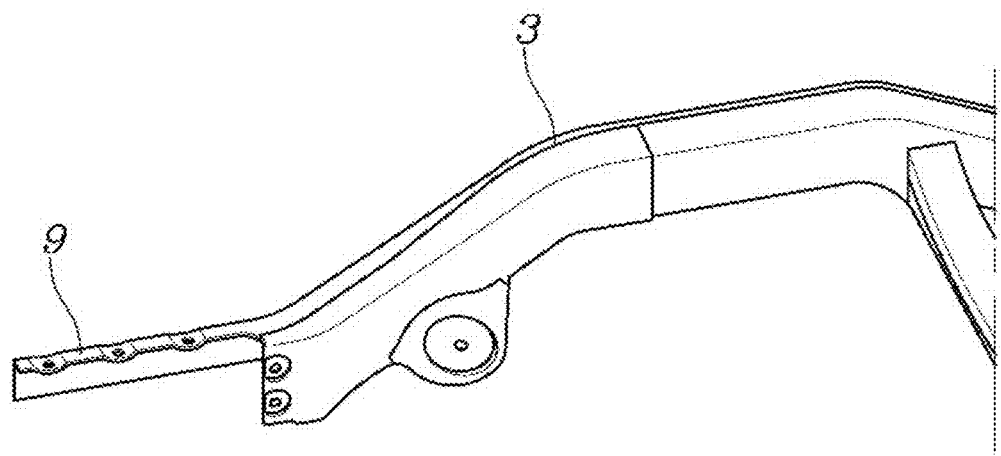
FIG. 3 is a detailed view illustrating a front end of a rear part frame in FIG. 1.
Figure 4:
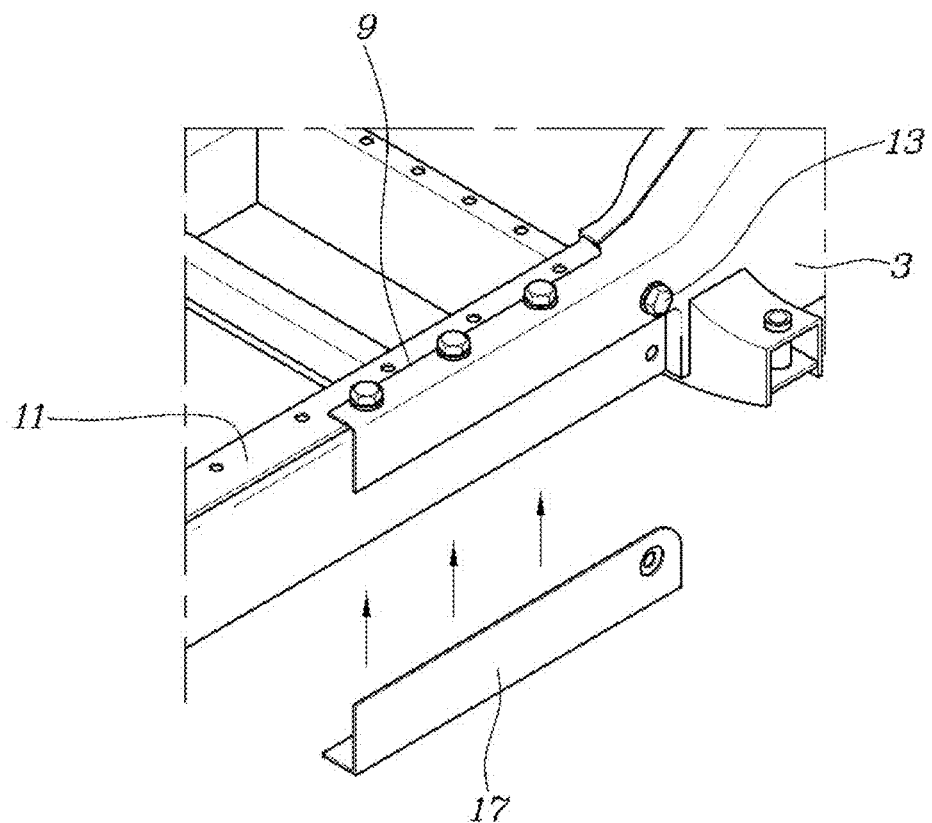
FIG. 4 is a view illustrating a state in which a stay is coupled to a coupling part between the center part frame and the rear part frame.

Specific structural or functional descriptions of embodiments of the present disclosure disclosed in this specification or application are exemplified only for the purpose of explaining the embodiments according to the present disclosure. The embodiments according to the present disclosure may be carried out in various forms. The present disclosure is not limited to the embodiments described in this specification or application.

Because the embodiments according to the present disclosure may be variously changed and may have various forms, specific embodiments are illustrated in the drawings and described in detail in the present specification or application. However, the descriptions of the specific embodiments are not intended to limit the embodiments according to the concept of the present disclosure. Still, it should be understood that the present disclosure covers all modifications, equivalents, and alternatives falling within the spirit and technical scope of the present disclosure.

The terms such as "first" and/or "second" may be used to describe various constituent elements, but these constituent elements should not be limited by these terms. These terms are used only for the purpose of distinguishing one constituent element from other constituent elements. For example, without departing from the scope according to the concept of the present disclosure, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, such as, "between" and "just between" or "adjacent to" and "directly adjacent to", for explaining a relationship between constituent elements, should be interpreted in a similar manner.

The terms used in the present specification are used to describe a specific embodiment and do not intend to limit the present disclosure. Singular expressions include plural expressions unless clearly described as different meanings in the context. In the present specification, it should be understood that the terms "comprises," "comprising," "includes," "including," "containing," "has," "having," or other variations thereof are inclusive and therefore specify the presence of stated features, numbers, steps, operations, elements, components, or combinations thereof. The terms do not preclude the presence or addition of one or more other features, numbers, steps, operations, elements, components, or combinations thereof.

Unless otherwise defined, all terms used herein, including technical or scientific terms, have the same meaning as commonly understood by those having ordinary skill in the art to which the present disclosure pertains. The terms such as those defined in commonly used dictionaries should be interpreted as having meanings consistent with meanings in the context of related technologies. The terms should not be interpreted as ideal or excessively formal meanings unless explicitly defined in the present specification.

Hereinafter, the present disclosure is described in detail through the description of various embodiments with reference to the accompanying drawings. Like reference numerals indicated in the respective drawings refer to like members.

Referring to FIGS. 1-12, a frame for a purpose-built vehicle (PBV) according to an embodiment of the present disclosure includes: a front part frame 1 positioned at a front side of a vehicle; a rear part frame 3 positioned at a rear side of the vehicle; and a center part frame 5. The center part frame 5 has a rectangular planar shape and is coupled between the front part frame 1 and the rear part frame 3.

In other words, the frame for a PBV according to the present disclosure is configured as a single frame 7 that is made by coupling the front part frame 1, the center part frame 5, and the rear part frame 3, as illustrated in FIG. 1.

Therefore, the frame is manufactured by independently manufacturing, coating, and combining the front part frame 1, the center part frame 5, and the rear part frame 3. Therefore, unlike the related art, electrodeposition coating may be performed by a comparatively small facility, and logistics costs may be remarkably reduced because vehicle mountability and handleability are excellent even when the frame is moved. Further, when a part of the frame is deformed by a vehicle collision accident or the like and thus needs to be replaced, the corresponding part of the frame may be replaced, which makes it possible to reduce the cost required for the maintenance of the vehicle.

Protruding coupling parts 9 may be respectively integrated with the ends of the front and rear part frames 1 and 3, which face the center part frame 5, and protrude to overlap the center part frame 5. The ease of coupling the front and rear part frames 1 and 3 and the center part frame 5 is thereby ensured and has improved coupling rigidity.

In other words, when the front and rear part frames 1 and 3 are respectively coupled to the front and rear sides of the center part frame 5, the protruding coupling part 9 serves to guide the front part frame 1 and the center part frame 5 so that the front part frame 1 and the center part frame 5 are easily aligned with each other. Further, the protruding coupling part 9 serves to guide the rear part frame 3 and the center part frame 5 so that the rear part frame 3 and the center part frame 5 are easily aligned with each other. In the state in which the frame is completely assembled, the protruding coupling parts 9 serve to increase the rigidity of the coupling part by overlapping the center part frame 5.

As described above, the center part frame 5 has a rectangular planar shape and includes side members 11 provided at two opposite sides of the center part frame 5, each having a quadrangular cross-section.

When the side member 11 of the center part frame 5 is deformed so that the length of the side member 11 increases or decreases, the rectangular planar shape is expanded or contracted such that the frame 7 is capable of being applied to various life modules and may be easily configured.

Figure 7:
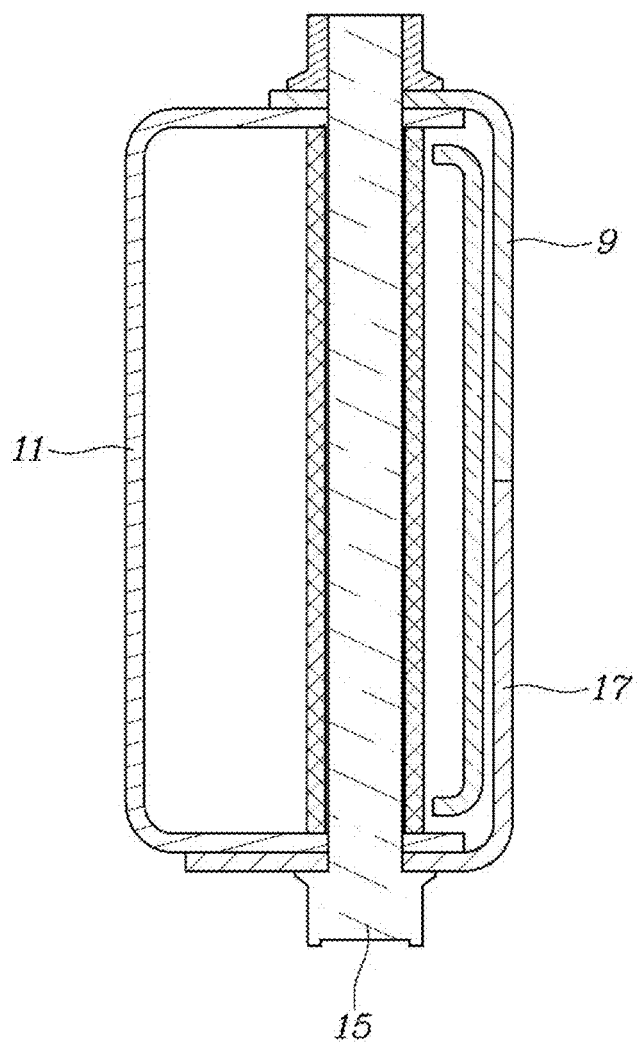
FIG. 7 is a cross-sectional view taken along line VII-VII in FIG. 5.

The protruding coupling part 9 has an open cross-section that surrounds a part of a transverse section of the center part frame 5 (see FIG. 7).

For example, the protruding coupling part 9 may have an L-shaped cross-section formed to surround one edge of the quadrangular cross-section of the side member 11.

Therefore, during the process of assembling the front part frame 1 and the center part frame 5, the protruding coupling part 9 of the front part frame 1 may surround one edge of the side member 11 of the center part frame 5. Further, the protruding coupling part 9 may guide the front part frame 1 and the center part frame 5 so that the front part frame 1 and the center part frame 5 are easily aligned. The same may apply to the process of assembling the rear part frame 3 and the center part frame 5.

The protruding coupling part 9 may have a cross-sectional shape that surrounds one edge of the quadrangular cross-section of the side member 11, which is positioned outside a vehicle body.

For example, as illustrated in FIGS. 3-6, the protruding coupling part 9 has an L-shaped cross-section that surrounds one edge of the quadrangular cross-section of the side member 11, which is positioned at an outer upper side of the vehicle body.

The side member 11 of the center part frame 5 is fixed to the front part frame 1 and the rear part frame 3 by first horizontal fastening members 13. The first horizontal fastening members 13 penetrate the protruding coupling parts 9 and the side member 11 in a transverse direction in a state in which two opposite ends of the side member 11 of the center part frame 5 are inserted into the front part frame 1 and the rear part frame 3.

In addition, the side member 11 of the center part frame 5 is fixed to the front part frame 1 and the rear part frame 3 by vertical fastening members 15. The vertical fastening members 15 penetrate the protruding coupling parts 9 and the side member 11 in an upward/downward direction in the state in which the side member 11 of the center part frame 5 overlaps the protruding coupling parts 9.

Meanwhile, stays 17 are coupled to the side member 11 of the center part frame 5. The stay 17 overlaps the side member 11 and surrounds the other edge other than the edge surrounded by the protruding coupling part 9.

In the present embodiment, the stay 17 has an L-shaped cross-section and is elongated in a longitudinal direction of the side member 11.

In addition, the vertical fastening member 15 is fastened while sequentially penetrating the stay 17, the side member 11, and the protruding coupling part 9.

In addition, the stay 17 is fixed to the side member 11 by a second horizontal fastening member 19 that penetrates the side member 11 and the stay 17 in the transverse direction.

In other words, the stay 17, the side member 11, and the protruding coupling part 9 are fixed by the vertical fastening member 15, the first horizontal fastening member 13, and the second horizontal fastening member 19 in the state in which the stay 17 and the protruding coupling parts 9 of the front and rear part frames 1 and 3 overlap the side member 11 of the center part frame 5. As a result, the front and rear part frames 1 and 3 are securely fixed to the center part frame 5.

In the embodiments of the present disclosure, the protruding coupling part 9 is installed to surround an upper edge of the quadrangular cross-section of the side member 11. The stay 17 is disposed below the protruding coupling part 9 and installed to surround a lower edge of the quadrangular cross-section of the side member 11.

Figure 5:
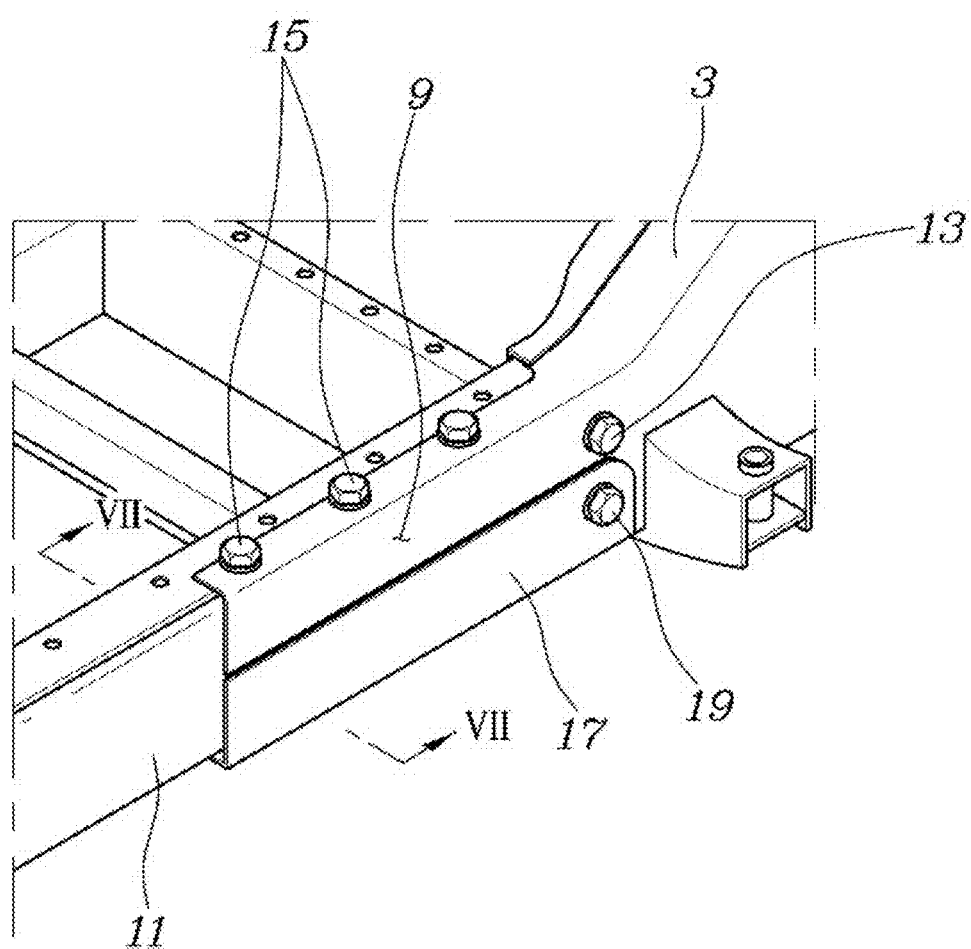
FIG. 5 is a view illustrating the coupling part between the center part frame and the rear part frame in FIG. 1 and illustrating a first embodiment in which a protruding coupling part and the stay are coupled to a side member of the center part frame.
Figure 6:
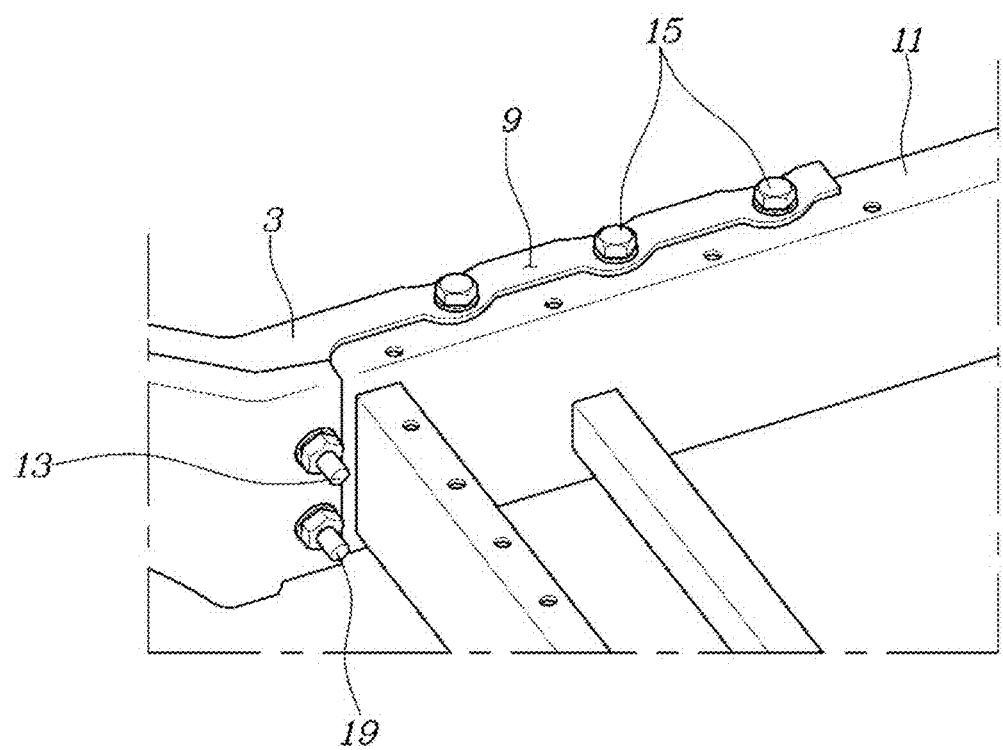
FIG. 6 is an observation view illustrating an opposite side to FIG. 5.

FIG. 5 is a view illustrating the coupling part between the center part frame 5 and the rear part frame 3. Further, FIG. 5 is a view illustrating a first embodiment in which the protruding coupling part 9 and the stay 17 are coupled to the side member 11 of the center part frame 5.

A lower end of the protruding coupling part 9 and an upper end of the stay 17 are installed to face and be in contact with each other while defining a straight line (see FIGS. 5 and 7).

Figure 8:
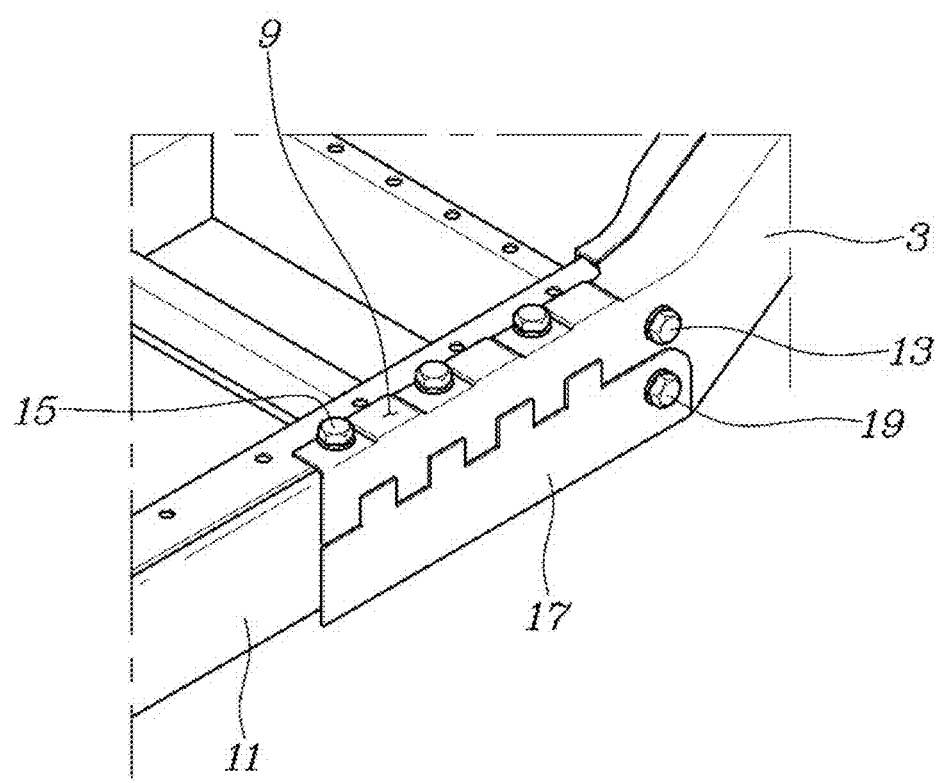
FIG. 8 is a view illustrating a second embodiment in which the protruding coupling part and the stay are coupled to the side member of the center part frame.

As illustrated in FIG. 8, the lower end of the protruding coupling part 9 and the upper end of the stay 17 may have concave-convex portions and be installed to face and be in contact with each other.

Since the lower end of the protruding coupling part 9 and the upper end of the stay 17 are installed to face and be in contact with each other, as described above, it is possible to implement a securely coupled state while surrounding the entire outer side of the side member 11 of the center part frame 5.

Figure 9:
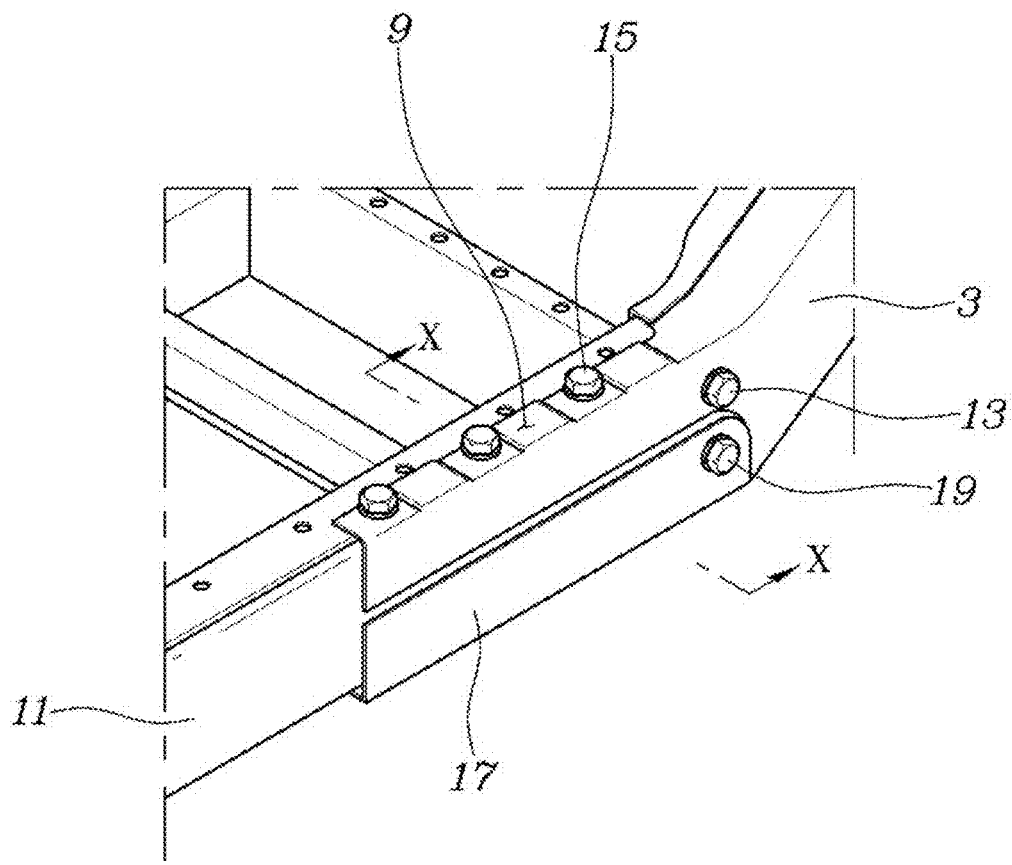
FIG. 9 is a view illustrating a third embodiment in which the protruding coupling part and the stay are coupled to the side member of the center part frame.
Figure 10:
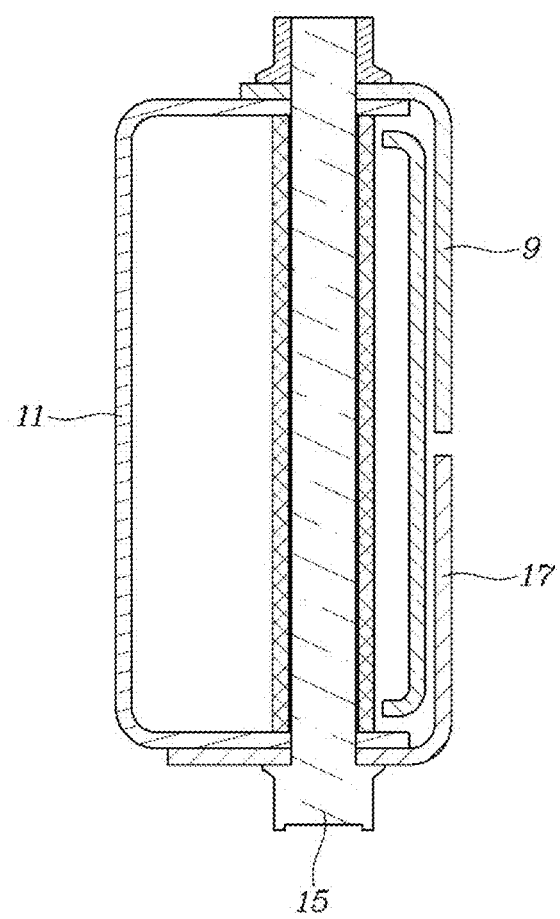
FIG. 10 is a cross-sectional view taken along line X-X in FIG. 9.

In addition, as illustrated in FIGS. 9 and 10, the lower end of the protruding coupling part 9 and the upper end of the stay 17 may be installed to face each other and have a predetermined interval therebetween.

The above-mentioned configuration may easily absorb processing errors or the like of the protruding coupling part 9 and the stay 17. Thus, relatively excellent assembly properties are thereby ensured in comparison with the embodiment in FIG. 5 or 8.

Figure 11:
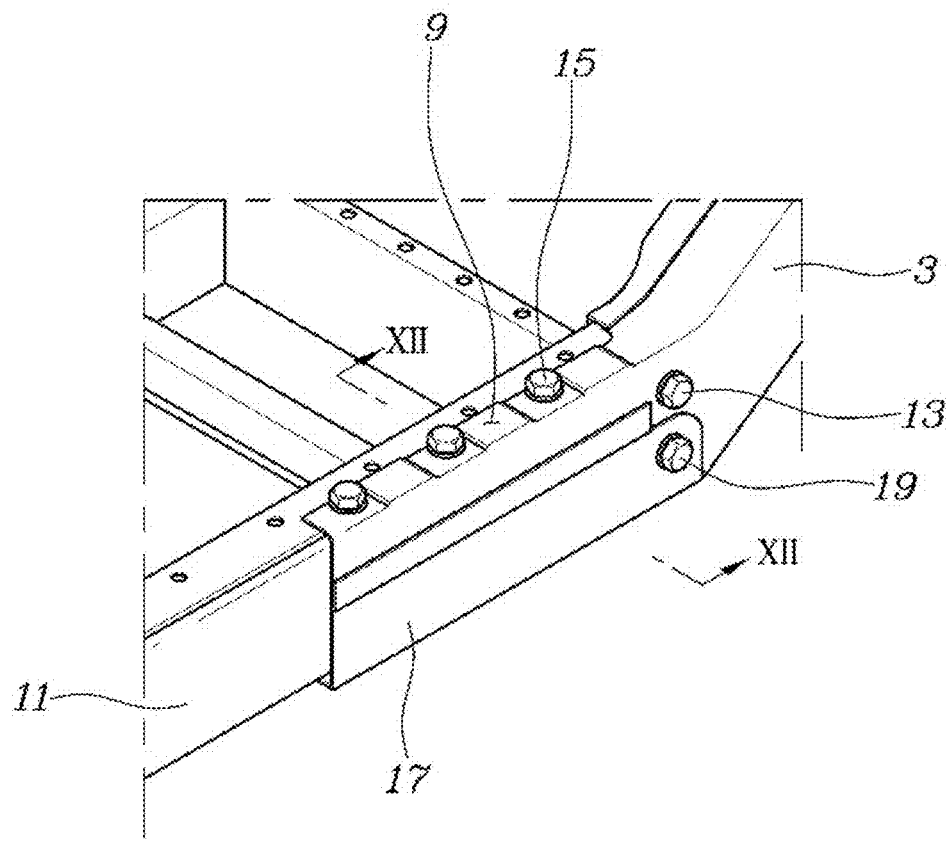
FIG. 11 is a view illustrating a fourth embodiment in which the protruding coupling part and the stay are coupled to the side member of the center part frame.
Figure 12:
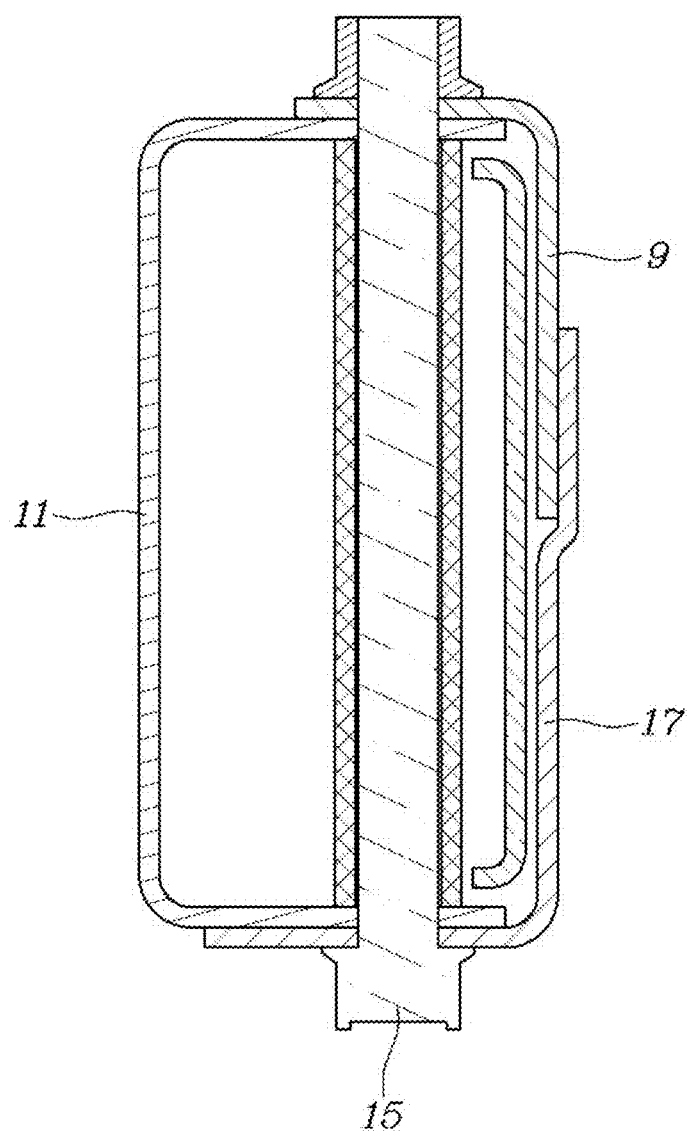
FIG. 12 is a cross-sectional view taken along line XII-XII in FIG. 11.

In addition, as illustrated in FIGS. 11 and 12, the protruding coupling part 9 and the stay 17 may be installed to overlap each other at a lateral side of the side member 11.

In other words, as illustrated, the stay 17 may extend upward while surrounding the lower end of the protruding coupling part 9 and thus partially overlap the outer side of the protruding coupling part 9.

Since the stay 17 and the protruding coupling part 9 are coupled to overlap each other as described above, it is possible to ensure stronger rigidity of the coupling part between the side member 11, the protruding coupling part 9, and the stay 17.

For reference, as illustrated, the first horizontal fastening member 13, the second horizontal fastening member 19, and the vertical fastening member 15 may each include a bolt and a nut. Similarly, the first horizontal fastening member 13, the second horizontal fastening member 19, and the vertical fastening member 15 may be configured as various other fastening members capable of maintaining a secure fastening force in the state of penetrating the side member 11, the protruding coupling part 9, and the stay 17.

Figure 13:
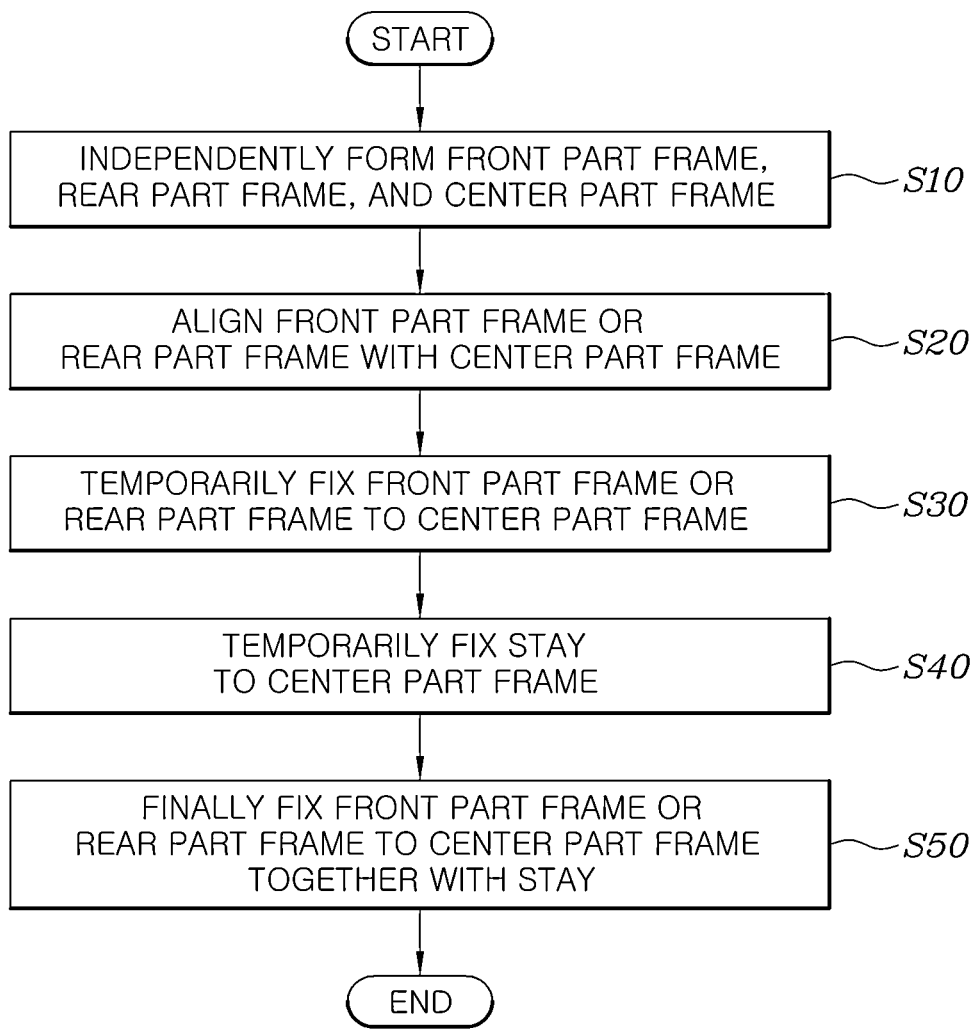
FIG. 13 is a flowchart illustrating an embodiment of a method of assembling the frame for a PBV according to the present disclosure.

Referring to FIG. 13, a method of assembling the frame for a PBV according to the embodiment of the present disclosure includes a step S10 of independently forming the front part frame 1 positioned at the front side of the vehicle, the rear part frame 3 positioned at the rear side of the vehicle, and the center part frame 5 positioned between the front part frame 1 and the rear part frame 3. The method further includes a step S20 of aligning at least one of the front and rear part frames 1 and 3 with the center part frame 5, and a step S30 of temporarily fixing at least one of the front and rear part frames 1 and 3, which is aligned with the center part frame 5, to the center part frame 5. The method also includes a step S40 of temporarily fixing the stay 17 to the center part frame 5, and a step S50 of finally fixing at least one of the front and rear part frames 1 and 3, which is temporarily fixed to the center part frame 5, to the center part frame 5 together with the stay 17.

FIG. 13 illustrates the method of assembling any one of the front and rear part frames 1 and 3 to the center part frame 5. However, the method is ultimately for assembling both the front and rear part frames 1 and 3 to the center part frame 5. For example, after the front part frame 1 is assembled to the center part frame 5 by the method illustrated in FIG. 13, the rear part frame 3 is then assembled to the center part frame 5 by the same method.

Of course, the front part frame 1 and the rear part frame 3 may be simultaneously assembled to the center part frame 5, or the rear part frame 3 may be assembled first.

Since the protruding coupling parts 9 are provided at the ends of the front and rear part frames 1 and 3 facing the center part frame 5 and protrude to overlap the center part frame 5, the front part frame 1 and the rear part frame 3 are aligned with the center part frame 5 as the protruding coupling parts 9 overlap the center part frame 5.

In other words, the front part frame 1 and the rear part frame 3 are aligned with the center part frame 5 so that the protruding coupling parts 9 surround the edge of the side member 11.

At least one of the front part frame 1 and the rear part frame 3, which is aligned with the center part frame 5, is temporarily fixed to the center part frame 5 by the first horizontal fastening members 13. The first horizontal fastening members 13 penetrate the protruding coupling parts 9 and the center part frame 5 in the transverse direction.

In addition, the stay 17 is temporarily fixed to the center part frame 5 by the second horizontal fastening member 19 that penetrates the center part frame 5 and the stay 17 in the transverse direction.

In the above-mentioned state, the front part frame 1 and the rear part frame 3 are finally fixed to the center part frame 5 by the vertical fastening members 15 that sequentially penetrate the stays 17, the center part frame 5, and the protruding coupling parts 9. As a result, the front part frame 1, the center part frame 5, and the rear part frame 3 are completely assembled into a single frame.

While the specific embodiments of the present disclosure have been illustrated and described, it should be apparent to those having ordinary skill in the art that the present disclosure may be variously modified and changed without departing from the technical spirit of the present disclosure defined in the appended claims.

What is claimed is:

1. A frame for a purpose-built vehicle (PBV), the frame comprising:
   a front part frame positioned at a front side of a vehicle;
   a rear part frame positioned at a rear side of the vehicle; and
   a center part frame having a rectangular planar shape and coupled between the front part frame and the rear part frame,
   wherein protruding coupling parts are respectively provided integrally with ends of the front and rear part frames facing the center part frame and protrude to overlap the center part frame,
   wherein side members each having a quadrangular cross-section are provided at two opposite sides of the center part frame, and
   wherein the protruding coupling parts each have
      an open cross-section that surrounds a part of a transverse section of the center part frame,
      an L-shaped cross-section that surrounds one edge of the quadrangular cross-section of a respective one of the side members, and
      a cross-sectional shape that surrounds one edge of the quadrangular cross-section of the respective one of the side members positioned outside a vehicle body.

2. The frame of claim 1, wherein each of the side members of the center part frame is fixed to the front part frame and the rear part frame by first horizontal fastening members that penetrate the protruding coupling parts and the side members in a transverse direction in a state in which two opposite ends of each of the side members of the center part frame are respectively inserted into the front part frame and the rear part frame.

3. The frame of claim 2, wherein each of the side members of the center part frame is fixed to the front part frame and the rear part frame by vertical fastening members that penetrate the protruding coupling parts and the side members in an upward/downward direction in a state in which the side members of the center part frame overlap the protruding coupling parts.

4. The frame of claim 3, wherein stays are respectively coupled to the side members of the center part frame so as to overlap the respective side members of the center part frame and surround another edge other than the edge surrounded by the protruding coupling parts.

5. The frame of claim 3, wherein each of the stays has an L-shaped cross-section and is elongated in a longitudinal direction of the side members.

6. The frame of claim 5, wherein each of the vertical fastening members is fastened while sequentially penetrating one of the stays, one of the side members, and one of the protruding coupling parts.

7. The frame of claim 6, wherein each stay is fixed to a respective one of the side members by a second horizontal fastening member that penetrates the respective one of the side members and the stay in the transverse direction.

8. The frame of claim 7, wherein the protruding coupling parts are respectively installed to surround an upper edge of the quadrangular cross-section of the side members, and wherein the stays are respectively disposed below the protruding coupling parts and installed to surround a lower edge of the quadrangular cross-section of the side members.

9. The frame of claim 8, wherein a lower end of each of the protruding coupling parts and an upper end of the respective stay are installed to face and be in contact with each other while defining a straight line.

10. The frame of claim 8, wherein a lower end of each of the protruding coupling parts and an upper end of the respective stay have concave-convex portions and are installed to face and be in contact with each other.

11. The frame of claim 8, wherein a lower end of each of the protruding coupling parts and an upper end of the respective stay are installed to face each other and have a predetermined interval therebetween.

12. The frame of claim 8, wherein each of the protruding coupling parts and the respective stay are installed to overlap each other at a lateral side of the respective one of the side members.

* * * * *